US007114372B2

(12) United States Patent
Kano et al.

(10) Patent No.: US 7,114,372 B2
(45) Date of Patent: Oct. 3, 2006

(54) FUEL VAPOR LEAK CHECK MODULE

(75) Inventors: Masao Kano, Gamagori (JP); Mitsuyuki Kobayashi, Gamagori (JP); Yoshichika Yamada, Kuwana-gun (JP)

(73) Assignee: Denso Corporation, (JP)

( * ) Notice: Subject to any disclaimer, the term of this patent is extended or adjusted under 35 U.S.C. 154(b) by 144 days.

(21) Appl. No.: 10/923,786

(22) Filed: Aug. 24, 2004

(65) Prior Publication Data

US 2005/0044932 A1 Mar. 3, 2005

(30) Foreign Application Priority Data

Aug. 25, 2003 (JP) .............................. 2003-300156

(51) Int. Cl.
*G01M 3/04* (2006.01)

(52) U.S. Cl. ........................................................ 73/49.7

(58) Field of Classification Search ................. 73/49.2, 73/49.7

See application file for complete search history.

(56) References Cited

U.S. PATENT DOCUMENTS 5,273,020 A * 12/1993 Hayami ...................... 123/520
5,817,925 A * 10/1998 Cook et al. .................... 73/40
6,550,315 B1 * 4/2003 Streib ......................... 73/49.7
7,036,359 B1 * 5/2006 Hayakawa et al. ........ 73/118.1
2003/0051541 A1 3/2003 Kano et al.

OTHER PUBLICATIONS

U.S. Appl. No. 10/911,555, filed Aug. 2004, Kobayashi et al.
U.S. Appl. No. 10/923,005, filed Aug. 2004, Tsuruta et al.
U.S. Appl. No. 10/923,774, filed Aug. 2004, Kobayashi et al.
U.S. Appl. No. 10/922,999, filed Aug. 2004, Kobayshi et al.

* cited by examiner

*Primary Examiner*—Hezron Williams
*Assistant Examiner*—John Fitzgerald
(74) *Attorney, Agent, or Firm*—Nixon & Vanderhye PC

(57) ABSTRACT

A fuel vapor leak check module has a pump discharging an air through an outlet. When the fuel vapor check module is mounted on a vehicle, an outlet of the pump is opened downwardly in the gravity direction. A housing has an opening provided above the outlet. The foreign particles discharged from the outlet of the pump are deposited on the inner surface of the housing. The foreign particles hardly reach to the opening even if the discharged air pushes up the foreign particles. Thus, the foreign particles are separated from the discharged air by the gravity to avoid the scatter thereof.

9 Claims, 7 Drawing Sheets

FUEL VAPOR LEAK CHECK MODULE

CROSS REFERENCE TO RELATED APPLICATION

This application is based on Japanese Patent Application No. 2003-300156 filed on Aug. 25, 2003, the disclosure of which is incorporated herein by reference.

FIELD OF THE INVENTION

The present invention relates to a fuel vapor leak check module, which detects leakage of fuel vapor generated in a fuel tank.

BACKGROUND OF THE INVENTION

In view of protecting the environment, fuel vapor has been controlled besides the exhaust emission control. According to the regulation established by the Environmental Protection Agency (EPA) and the California Air Resourced Board (CARB), a leak detection of the fuel vapor from a fuel tank is required.

A conventional leak check system shown in JP-10-90107A, which is a counterpart of U.S. Pat. No. 5,890,474, has a pump which generate a pressure gradient between an inside and an outside of a fuel tank. When a leakage of fuel vapor from the fuel tank, a load of a motor driving the pump fluctuates. The detection of fuel vapor leakage is conducted by checking the fluctuation of the motor load.

The pump has sliding portions such as a piston and a cylinder or a vane and a housing in order to generate a pressure gradient. When the pump is operated, foreign particles due to an abrasion in the sliding portion may be produced. The foreign particles may be scattered to cause some electric problems, such as short circuit, in a control circuit for the motor. Furthermore, the foreign particles may cause the motor to be stuck.

SUMMARY OF THE INVENTION

An object of the present invention is to reduce the scatter of the foreign particles generated in the pump in order to prevent the electrical and the mechanical problems.

According to the present invention, the outlet of the pump is opened downwardly in the gravity direction. The foreign particles fall from the outlet and are separated from the discharged air.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Figure 3:
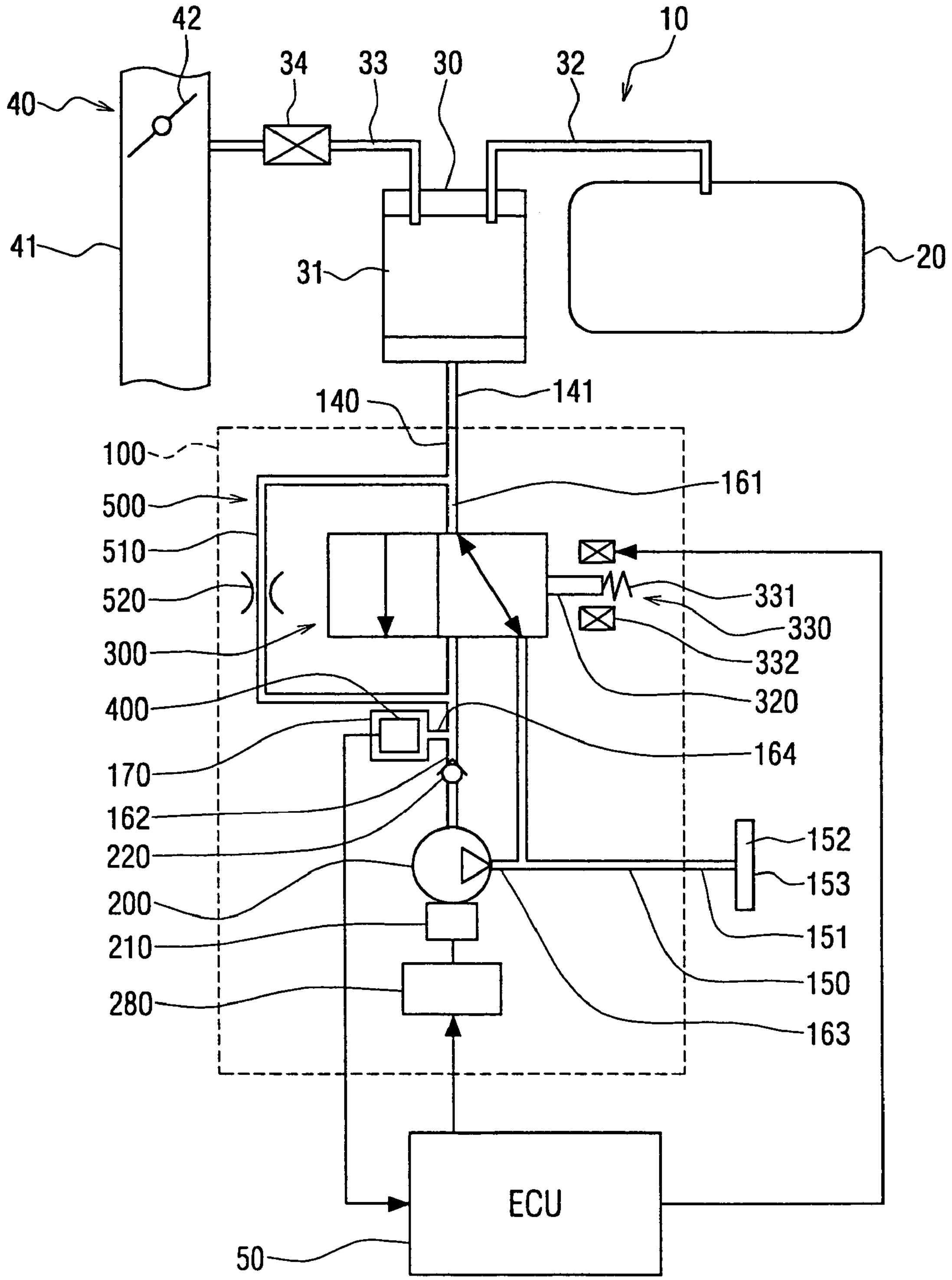
FIG. 3 is a schematic view showing a fuel vapor leak check system.

FIG. 3 shows a fuel vapor leak check system to which a fuel vapor leak check module is applied. The fuel vapor leak check system is referred to as the leak check system, the fuel vapor leak check module is referred to as the leak check module herein after.

Figure 2:
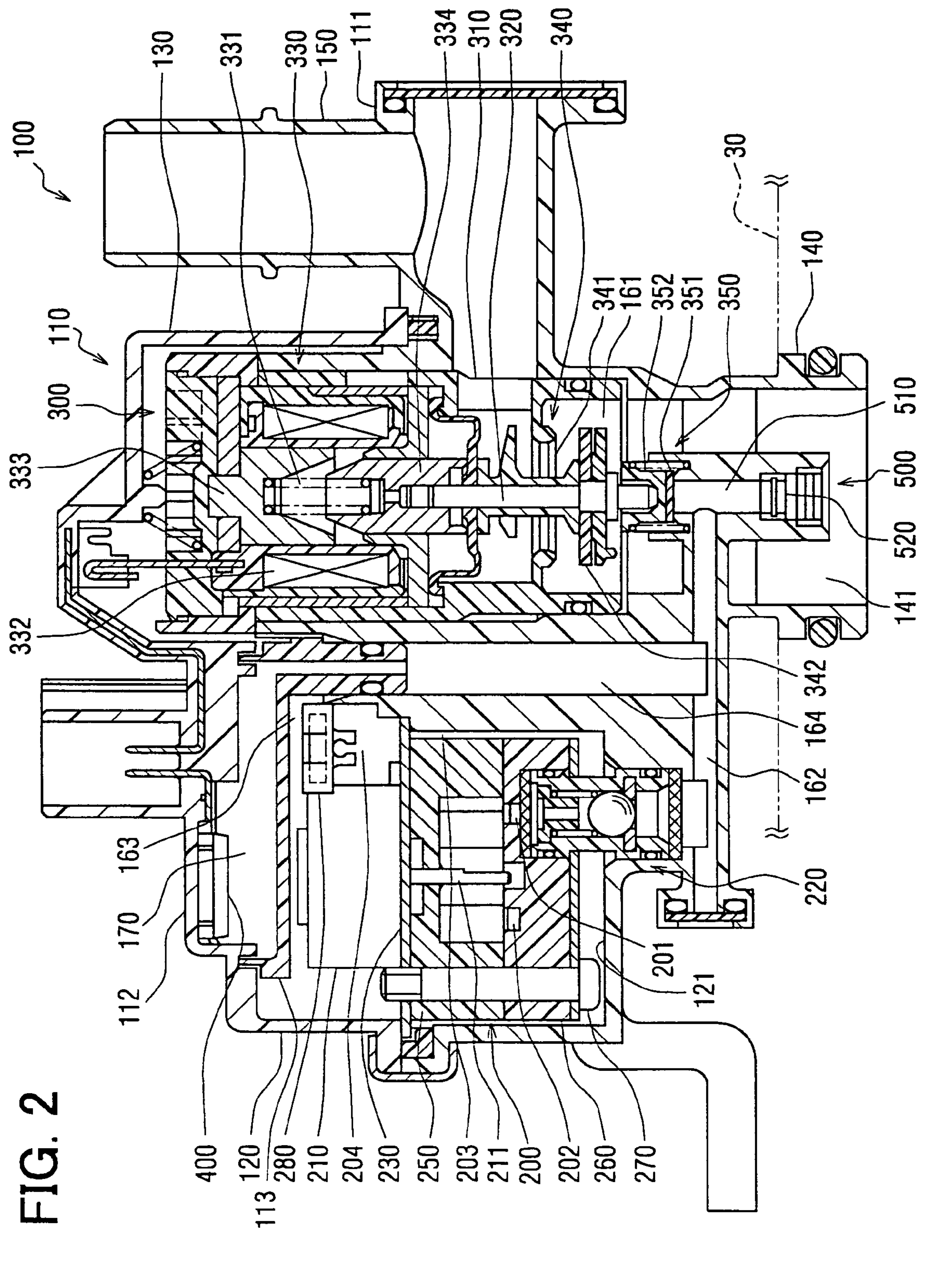
FIG. 2 is a cross sectional view of the fuel vapor leak check module.

The leak check module system 10 includes the leak check module 100, a fuel tank 20, a canister 30, an intake device 40, and an ECU 50. As shown in FIG. 2, the leak check module 100 is provided with a housing 110, a pump 200, brushless motor 210, a switching valve 300, and a pressure sensor 400. The leak check module 100 is disposed above the fuel tank 20 and the canister 30 to prevent a flow of a liquid fuel or other liquid which flows from the fuel tank 20 into the canister 30 and the leak check module 100.

The housing 110 comprises a housing body 111, and a housing cover 112. The housing 110 accommodates the pump 200, the brushless motor 210, and the switching valve 300. The housing 110 forms a pump accommodating space 120 and a valve accommodating space 130 therein. The pump 200 and the brushless motor 210 are disposed in the pump accommodating space 120, and the switching valve 300 is disposed in the valve accommodating space 120. The housing body 111 is provided with a canister port 140 and an atmospheric vent port 150. The canister port 140 communicates with the canister 30 through a canister passage 141. The atmospheric vent port 150 communicates with an atmospheric passage 151 having an open end 153 at which an air filter 152 is disposed. The atmospheric passage 151 communicates with an atmosphere. The housing body 111 can be made with the housing of the canister 30 integrally.

As shown in FIG. 2, the housing 110 has a connecting passage 161, a pump passage 162, a discharge passage 163, a pressure introducing passage 164, and a sensor room 170. The connecting passage 161 connects the canister port 140 with the atmospheric vent port 150. The pump passage 162 connects the connecting passage 161 with an inlet port 201 of the pump 200. The discharge passage 163 connects the outlet port 202 of the pump 200 to the atmospheric vent port 150. The pressure introducing passage 164 is branched from the pump passage 162 and connects the pump passage 162 and the sensor room 170. Since the sensor room 170 communicates with the pressure introducing passage 164, the inner pressure of the sensor room 170 is almost the same as the pressure in the pump passage 162.

The discharge passage 163 is formed between the housing piece 113 and the pump 200 and between the housing piece 113 and the brushless motor 210 in the pump accommodating space 120, and is formed between the housing 110 and the switching valve 300 in the valve accommodating space 130. An air discharged from the outlet port 202 of the pump flows into a clearance (not shown) between the switching valve 300 and the housing 110 through a clearance 203 between the pump 200 and the housing 110 and a clearance 204 between the brushless motor 210 and the housing 110. The air flowing into the clearance between the switching valve 300 and the housing 110 flows into the atmospheric vent port 150 along the clearance.

The housing 110 has an orifice portion 500 at the side of the canister port 140. The orifice portion 500 has an orifice passage 510 which branches from the canister passage 141. The orifice passage 510 connects the canister port 140 with the pump passage 162 and has an orifice 520 therein. The orifice 520 corresponds to the size of an opening for which leakage of fuel vapor is acceptable. For example, the CARB and EPA regulations provide for accuracy of detecting leakage of fuel vapor from fuel tank 20. The regulations require that fuel vapor leakage through an opening equivalent to an opening having a diameter of 0.5 mm should be detected. In the present embodiment, the orifice 520 has a diameter of 0.5 mm or less. The orifice passage 510 is formed at the inside of the canister port 140 to form a double cylinder by which the connecting passage 161 is formed outside and the orifice passage 510 is formed inside.

The pump 200 having an inlet port 201 and the outlet port 202 is provided in the pump accommodating space 120. The inlet port 201 is exposed to the pump passage 162 and the outlet port is exposed in the discharge passage 163. A check valve 220 is disposed at the vicinity of the inlet port 201 of the pump 200. When the pump is driven, the check valve 220 is opened. When the pump is not driven, the check valve is closed to restrict the flowing of air-mixed fuel into the pump 200.

Figure 4:
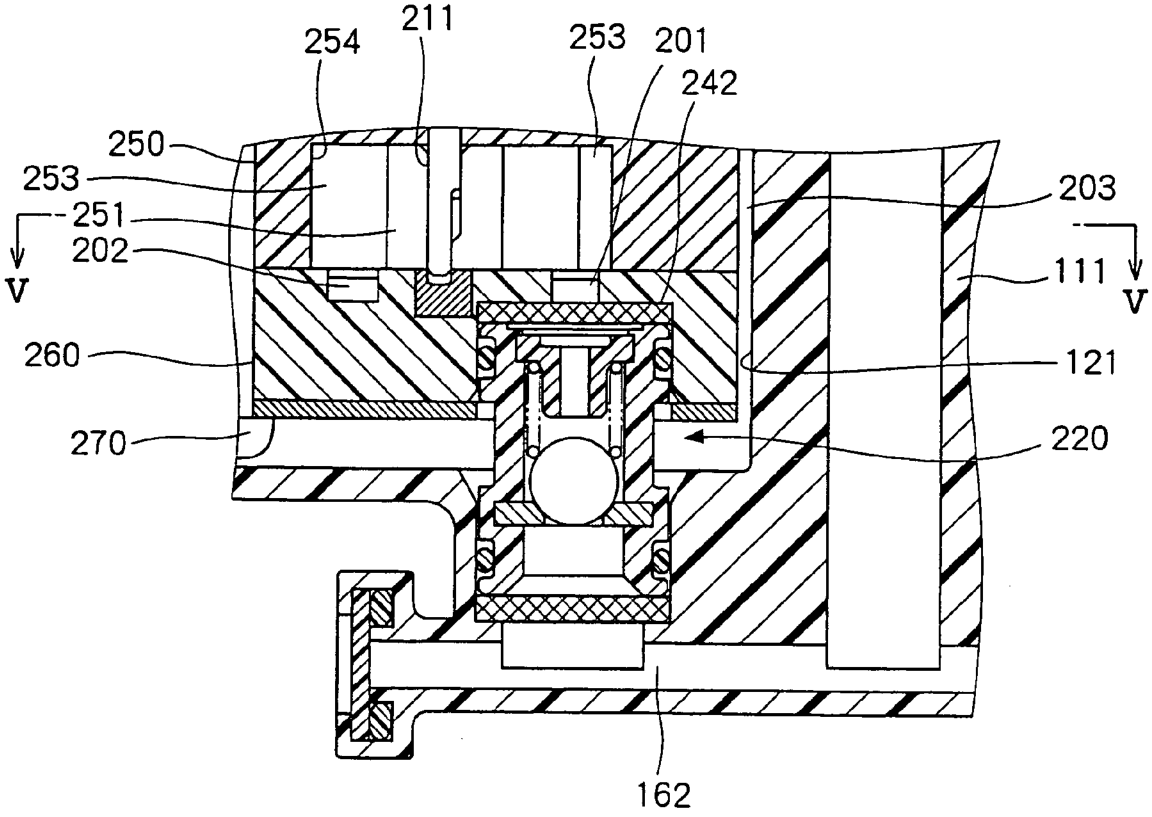
FIG. 4 is an enlarged cross sectional view of the pump and its vicinity.
Figure 5:
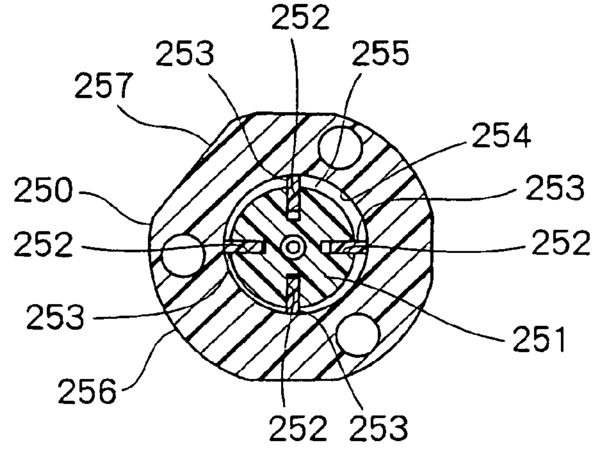
FIG. 5 is a cross sectional view of the pump along a line V—V of FIG. 4.
Figure 6:
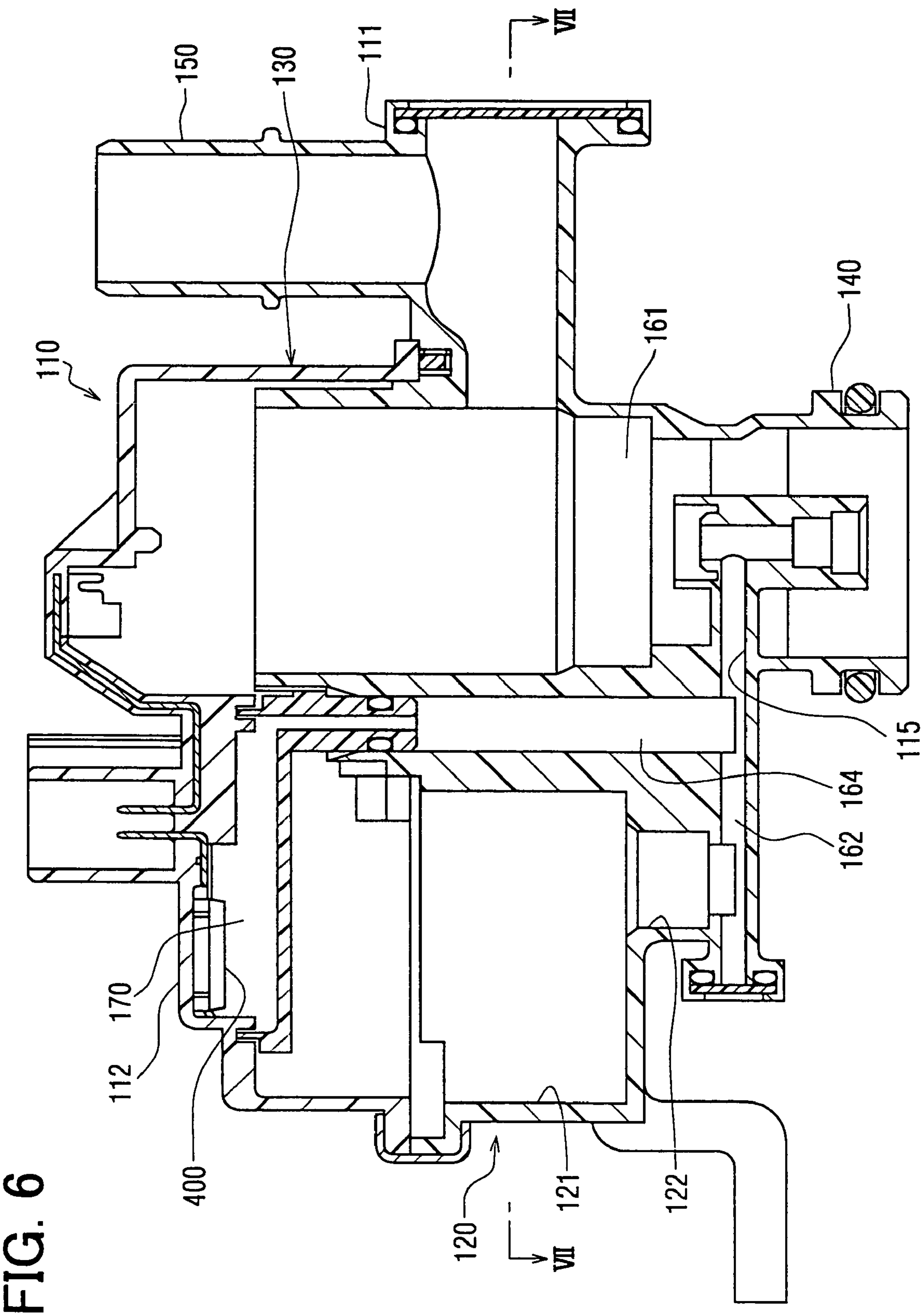
FIG. 6 is a cross sectional view of a housing of the fuel vapor leak module.

The pump 200 is provided with a cover 250 and a case 260 to form a housing in which a rotor 251 is disposed as shown in FIG. 4. The rotor 251 has a groove 252 in which a vane 253 is slidablly inserted in a radial direction of the rotor 251 as shown in FIG. 5. The cover 250 has a cylinder wall 254 of which center axis is offset relative to a center of the rotor 251. A pump chamber 255 is formed by a rotor 251, the cylinder wall 254 and adjacent vanes 253. The rotor 251 rotates around the center axis while the vane 253 slidablly moves on the cylinder wall 254. Since the center axis of rotor is offset relative to the center axis of the cylinder wall 254, the vane 253 reciprocates in the groove 252. The air introduced into the pump chamber 255 through an inlet 201 is compressed and is discharged from the outlet 201. The inlet 201 communicates with the fuel tank 20 through the canister 30. Thus, when the pump is operated, the inner pressure of the fuel tank 20 is reduced.

The pump 200 is provided with a brushless motor 210 of which shaft 211 is connected to the rotor 251 having the vane 253. That is, the brushless motor 210 drive the pump 200. The brushless motor 210 is a DC motor which has no electric contact point, which is not shown, and rotates the rotor 251 by changing a current applying position to a coil. The brushless motor 210 is electrically connected to a control circuit 280 which controls the brushless motor 210 in a constant speed by controlling electricity from an electric source. The control circuit 280 is disposed in a clearance 204 which forms the discharge passage 163. The control circuit 280 includes an electronic part generating heat such as a Zener diode. By disposing the control circuit 280 in the clearance 204, the control circuit 280 is cooled by air discharged from the pump 200.

The switching valve 300 includes a valve body 310, a valve shaft 320, and a solenoid actuator 330. The valve body 310 is disposed in the valve accommodating space 130. The switching valve 300 includes an opening-closing valve 340 and a reference valve 350. The opening-closing valve 340 includes a first valve sheet 341 and a washer 342 which is provided on the valve shaft 320. The reference valve 350 includes a second valve sheet 351 formed on the housing 110 and a valve cap 352 fixed on one end of the valve shaft 320.

The valve shaft 320 is actuated by the solenoid actuator 330 and has the washer 342 and valve cap 352. The solenoid actuator 330 has a spring 331 biasing the valve shaft 320 toward the second valve sheet 351. The solenoid actuator 330 has a coil 332 which is connected to the ECU 50. The ECU 50 controls an electric supply to the coil 332. When the electric current is not supplied to the coil 332, no attracting force is generated between a fixed core 333 and a movable core 334. Thus, the valve shaft 320 fixed to the movable core 334 moves down in FIG. 2 by biasing force of the spring 331 so that the valve cap 352 closes the second valve sheet 351. Thereby, the connecting passage 161 is disconnected from the pump passage 162. The washer 342 opens the first valve sheet 341 to communicate the canister port 140 to the atmospheric vent port 150 through the connecting passage 161. Therefore, when the electric current is not supplied to the coil 332, the canister port 140 is disconnected from the pump passage 162 and the canister port 140 is communicated to the atmospheric vent port 150.

When the electric current is supplied to the coil 332 according to the signal from the ECU 50, the fixed core 333 attracts the movable core 334. The valve shaft 320 connected with the movable core 334 moves up against the biasing force of the spring 331. The valve cap 352 opens the second valve sheet 351 and the washer 342 close the first valve sheet 341 whereby the connecting passage 161 communicates the pump passage 162. Therefore, when the coil is energized, the canister port 140 communicates with the pump passage 162 and the canister port 140 disconnects from the atmospheric vent port. The orifice passage 510 always communicates with the pump passage 162, regardless of whether the coil 332 is energized.

The canister 30, as shown in FIG. 3, has therein a fuel vapor adsorbent material 31 such as activated carbon granules, which adsorbs fuel vapor generated in the fuel tank 20. The canister 30 is disposed between the leak check module 100 and the fuel tank 20. The canister passage 141 connects the canister 30 with the leak check module 100 and a tank passage connects the canister 30 with the fuel tank 20. A purge passage 33 connects the canister 31 to an intake pipe 41 of the intake device 40. The fuel vapor generated in the fuel tank 20 is adsorbed by the adsorbent material 31 while flowing through the canister 30. The fuel concentration in the air flowing out from the canister 30 is less than a predetermined value. The intake pipe 31 has a throttle valve 42 therein which controls air amount flowing in the intake pipe 31. The purge passage 33 has a purge valve 34 which opens and closes the purge passage 33 according to the signal from the ECU 50.

The pressure sensor 400, as shown in FIG. 2, is disposed in the sensor room 170. The pressure sensor 400 detects the pressure in the sensor room 170 and outputs signals to the ECU 50 according to the detected pressure. The sensor room 170 communicates with the pump passage 162 through the pressure introducing passage 164. Thus, the pressure in the sensor room 170 is substantially equal to the pressure in the pump passage 162. The pressure sensor 400 is disposed far from the pump 200 by which pressure fluctuation caused by the pump 200 is more reduced than the case in which the pressure sensor 400 is disposed close to the inlet port 201 of the pump 200. Therefore, the pressure sensor 400 detects the pressure in the sensor room 170 more precisely.

The ECU 50 is comprised of microcomputer which has CPU, ROM, and RAM (not shown) and controls the leak check module 100 and other components on the vehicle. The ECU 50 receives multiple signals from sensors to execute control programs memorized in ROM. The brushless motor 210 and the switching valve 300 are also controlled by the ECU 50.

The pump 200 is disposed in the pump accommodating space 120. The pump accommodating space 120 is comprised of a pump room 121 for receiving a pump 200, and check valve room 122 for receiving a check valve 220.

Figure 7:
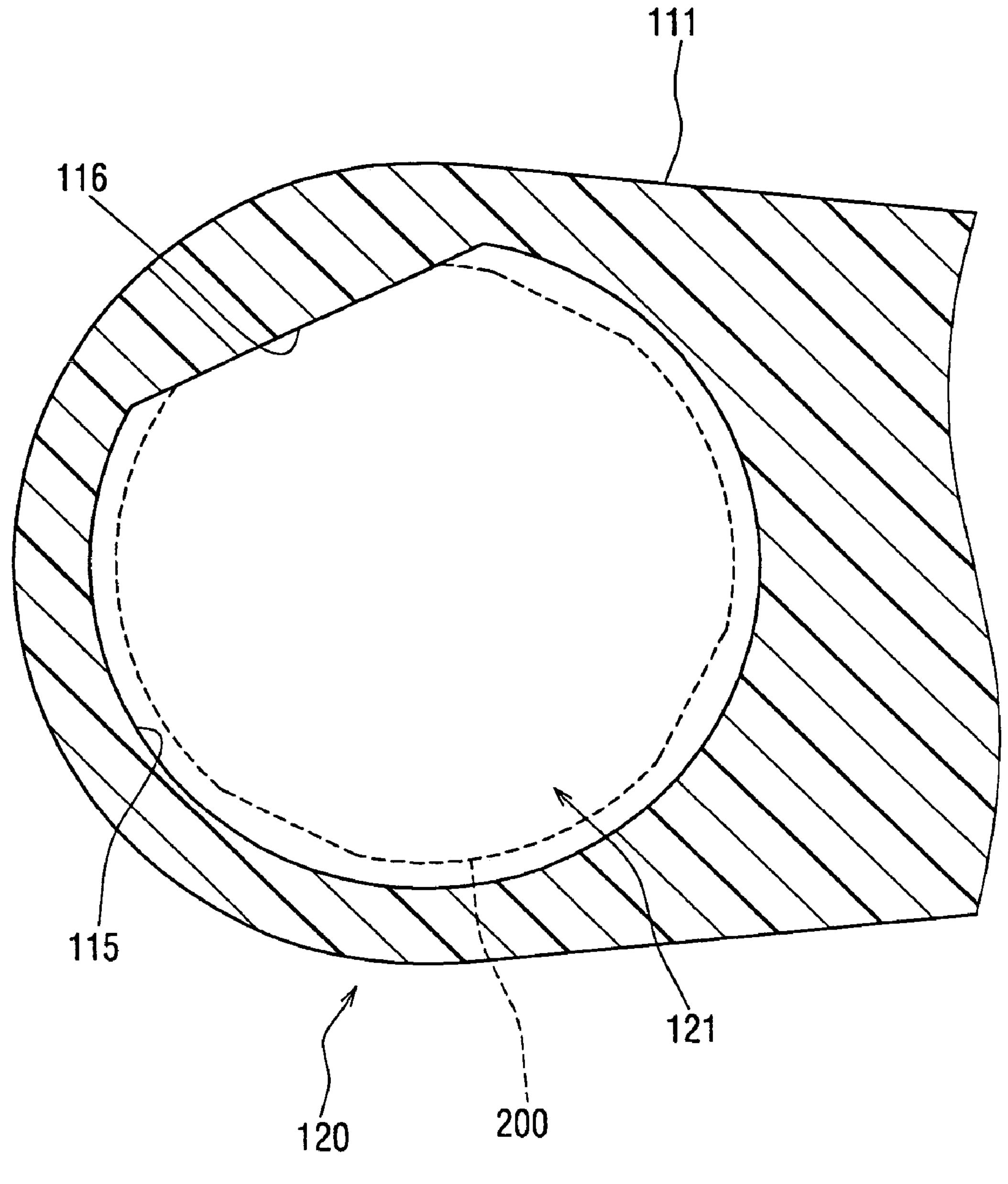
FIG. 7 is an enlarged cross sectional view along a line VII—VII of FIG. 6.

An inner diameter of the pump room 121 larger than an outer diameter of a cover 250 and a case 260, the cover 250 and the case 260 construct the pump housing. The inner surface of the pump room 121 is comprised of a curvature portion 115 and flat portion 116, as shown in FIG. 7. The flat portion 116 connects both ends of the curvature portion 115. That is, the cross sectional view of the pump room 121 is shaped like "D".

The pump 200 has a cover 250 and a case 260 as show in FIG. 4. A flange 230 is disposed between the cover 250 and the brushless motor 210. The cover 250, the case 260, and the flange 230 are integrally assembled by a bolt 270.

The flange 230 has a larger diameter than the inner diameter of the pump room 121, whereby the pump room 121 is almost closed by the flange 230. The flange 230 has a notch 231 which makes an opening 123 in the pump room 121. The shape of the notch 231 can be any shape.

Figure 1:
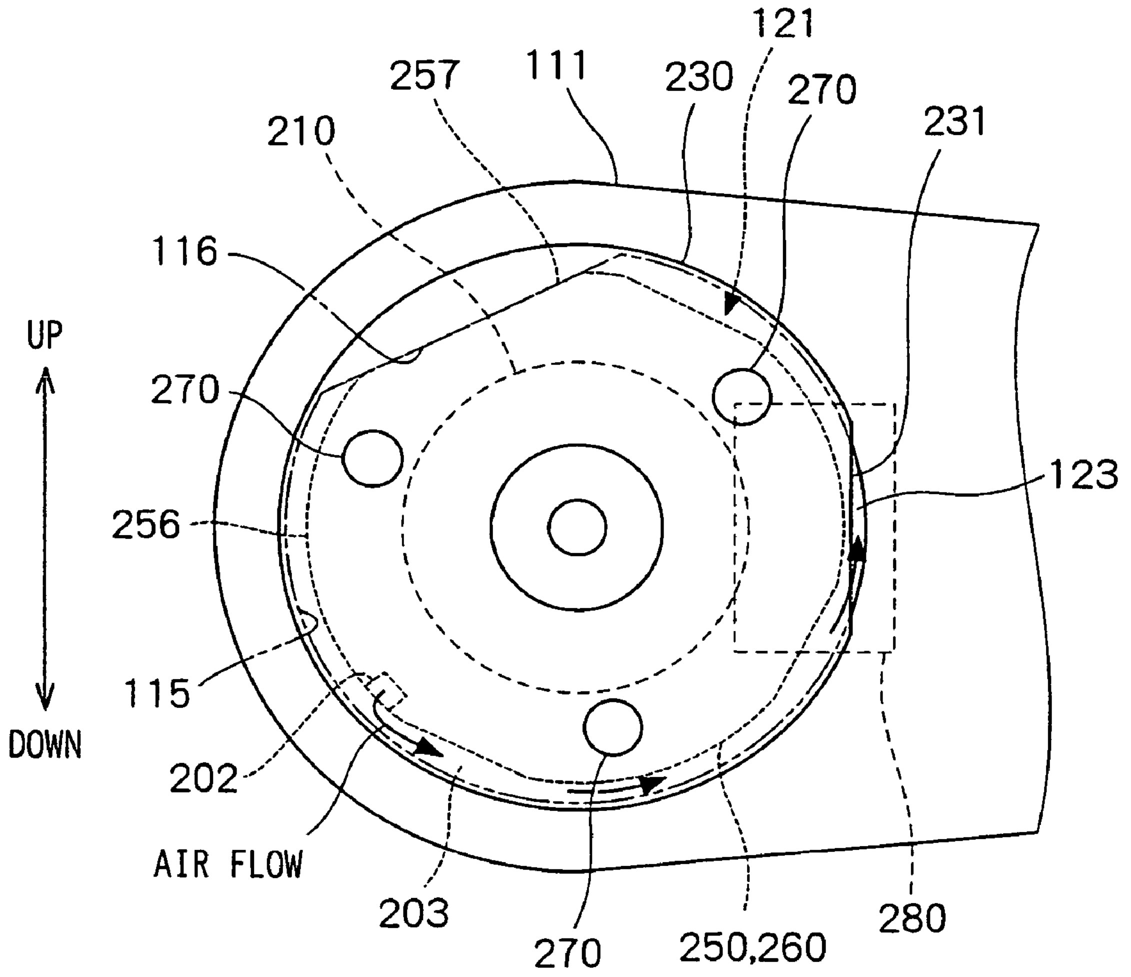
FIG. 1 is a schematic view of a flange in viewing from a brushless motor.

The cover and the case 250, as shown in FIGS. 1 and 5, have a curvature outer surface 256 and a flat outer surface 257. When the pump 200 is accommodated in the pump room 121, the flat outer surface 257 confronts the flat portion 116 of the housing 111. Both edges of the flat outer surface 257 can be contact with the flat portion 116 of the housing body 111 so that the rotation of the pump 200 in the housing body 111 is restricted. That is, the flat portion 116 of the housing body 111 functions as a stopper which prevents a rotation of the pump 200 in the housing body 111. In other words, when the pump 200 is assembled in the pump room 121, by confronting the flat outer surface 257 to the flat portion 116, the pump 200 is accurately positioned in the housing body 111.

The case 260 has an outlet 202 through which a compressed air by the pump 200 is discharged. The outlet 202 is positioned at a side surface of the case 260. The leak check module 100 is mounted on the vehicle in such a manner that the axial of the motor 200 is orthogonal to the gravity direction, in other words, the cross section of FIG. 2 is confronted downwardly. Thus, the outlet 202 is opened downwardly in the gravity direction so that the foreign particles, such as abrasion particles produced in the pump 200, are expelled through the outlet 202 to be deposited on the inner side of the housing body 111.

Each of the cover 250 and the case 260 has a smaller diameter than the inner diameter of the pump room 121 so that a clearance 203 is formed between the housing body 111 and the cover 250, and between the housing cover body 111 and the case 260. Both ends of the clearance 203 are closed by the flange 203 so that the air discharged from the pump 200 flows around the cover 250 and the case 260 along the clearance 203.

The opening 123 is positioned above the outlet 202 so that the discharged air flows up to the opening 123 against gravity. Then, the air flows into the clearance 204 via the opening 123, the clearance 204 being formed between the brushless motor 210 and the housing body 111. Since the clearance 204 communicates with the atmospheric vent port 150 via a clearance (not shown) formed between the switching valve 300 and the housing 110, the air discharged from the outlet 202 flows out into the atmosphere via the clearance 203, the opening 123, the clearance 204, the clearance (not shown) between the switching valve and the housing 110, and the atmospheric vent port 150, which construct the discharge passage 163.

The control circuit 280 is disposed in the discharge passage 163 in such a manner that the circuit 280 confronts the opening 123, so that cooling of the control circuit 280 is improved.

The operation of the leak check module 100 is described herein after.

When a predetermined period elapses after the engine is turned off, the fuel vapor leak check is conducted. The predetermined period is set to stabilize the vehicle temperature. While the engine is running and until the predetermined period elapses after the engine is turned off, the fuel vapor leak check by the leak check module 100 is not conducted. The coil 332 is not energized, and the canister port 140 and the atmospheric vent port 150 are connected with each other through the connecting passage 161. The fuel vapor fraction of the fuel vapor/air mixture adsorbs in the canister 30. Then, the air fraction is expelled from the opening end 153 of the atmospheric passage 151. At this moment, the check valve 220 is closed, air including fuel vapor generated in the fuel tank 20 is prevented from flowing into the pump 200.

(1) When the predetermined period elapses after the engine is turned off, an atmospheric pressure is detected prior to the fuel vapor leak check. That is, since the fuel vapor leak check is conducted based on the pressure change with the pressure sensor 400, it is necessary to reduce an atmospheric effect due to altitude. When the coil 332 is not energized, the atmospheric vent port 150 communicates with the pump passage 162 through the orifice passage 510. Since the sensor room 170 communicates with the pump passage 162 through the pressure introducing passage 164, the pressure in the sensor room 170 is substantially equal to the atmospheric pressure. The atmospheric pressure detected by the pressure sensor 400 is converted to a pressure signal, the pressure signal being output to the ECU 50. The pressure signal from the pressure sensor 400 is outputted as a ratio of voltage, a duty ratio, or a bit output. Thus, the noise effect generated by the solenoid actuator 330 or other electric actuators can be reduced to maintain the detection accuracy of the pressure sensor 400. At this moment, only the pressure sensor 400 is turned on and the brushless motor 210 and the switching valve 300 are turned off. This state is indicated as an atmospheric pressure detection period A in FIG. 8. The pressure detected in the sensor room 170 is equal to the atmospheric pressure.

(2) After the atmospheric pressure is detected, the altitude at which the vehicle is parked is calculated according to the detected atmospheric pressure. For example, the altitude is calculated based on a map showing a relationship between the atmospheric pressure and the altitude, which is memorized in ROM of the ECU 50. The other parameters are corrected according to the calculated altitude. The calculation and the correction above are executed by ECU 50.

Figure 8:
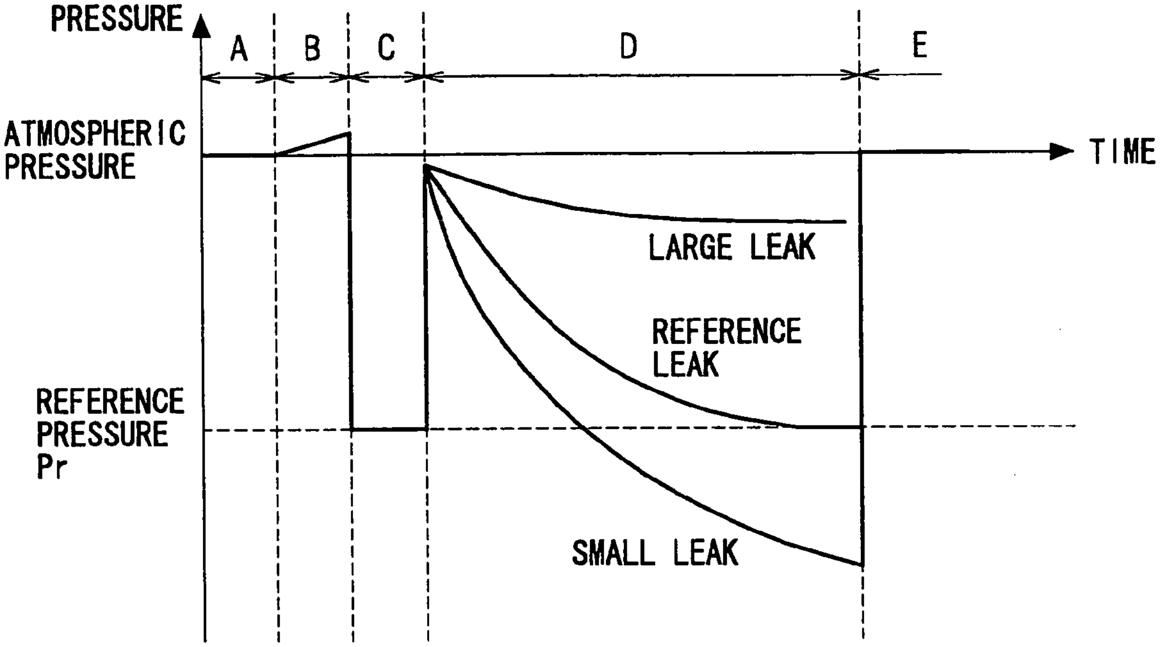
FIG. 8 is a graph showing pressure change detected by a pressure sensor.

After the correction of parameters is executed, the coil 332 of the switching valve 300 is energized of which state is indicated as a fuel vapor detection period B in FIG. 8. Since the coil 332 is energized, the fixed core 333 attracts the movable core 334 so that the washer 342 closes the first valve sheet 341 and the valve cap 352 opens the second valve sheet 351. The atmospheric vent port 150 disconnects from the pump passage 162, and the canister port 140 connects to the pump passage 162. As a result, the sensor room 170 connected to the pump passage 162 is connected with the fuel tank 20 through the canister 30. The pressure in the fuel tank 20 is larger than the ambient pressure due to the fuel vapor. The pressure detected by the pressure sensor 400 is slightly larger than the atmospheric pressure as shown in FIG. 8.

(3) When the increment of the pressure in the fuel tank 20 is detected, the coil 332 of the switching valve 300 is deenergized. This state is indicated as a reference detection range C in FIG. 8. The moving core 334 and the valve shaft 320 move in biasing direction of the spring 331 so that the washer 342 opens the first valve sheet 341 and the valve cap 352 closes the second valve sheet 351. The pump passage 162 communicates with the canister port 140 and the atmospheric vent port 150 through the orifice passage 510. The canister port 140 communicates with the atmospheric vent port 150 through the connecting passage 161.

When the brushless motor 210 is energized, the pump 200 is driven to reduce the pressure in the pump passage 162, so that the check valve 220 is opened. The air flowing into the canister port 140 from atmospheric vent port 150 and air/fuel mixture flowing from the canister port 140 flow into the pump passage 162 through the orifice passage 510. Since the air flowing into the pump passage 162 is restricted by the orifice 520 in the orifice passage 510, the pressure in the pump passage 162 is decreased as shown in FIG. 8. Since the orifice 520 has a constant aperture, the pressure in the pump passage 162 is decreased to a reference pressure Pr, which is memorized in RAM of the ECU 50. After the reference pressure Pr is detected, the brushless motor 210 is deenergized.

(4) When the detection of reference pressure is finished, the coil 322 of the switching valve 300 is energized again. The washer 342 closes the first valve seat 341 and the valve cap 352 opens the second valve sheet 351 so that the canister port 140 communicates with the pump passage 162. That is, the fuel tank 20 communicates with the pump passage 162 so that the pressure in the pump passage 162 becomes equal to the pressure in the fuel tank 20. The pressure in the fuel tank 20 is almost the atmospheric pressure. The brushless motor 210 is energized again to drive the pump and to open the check valve 220 so that the pressure in the fuel tank 20 decreases. The pressure in the sensor room 170, which is detected by the pressure sensor 400, decreases gradually. This state is illustrated as decompression range D in FIG. 8.

While the pump 200 is operated, when the pressure in the sensor room 170, which is equal to the pressure in the fuel tank 20, becomes under the reference pressure Pr, it is determined that the amount of fuel vapor leakage is under the permissible value. In other words, no air is introduced into the fuel tank 20 from outside, or amount of air introducing into the fuel tank is less than the amount which is equivalent to the orifice leakage. Therefore, it is determined that the sealing of the fuel tank 20 is enough.

On the other hand, when the pressure in the fuel tank 20 does not decrease to the reference pressure Pr, it is determined that the amount of fuel vapor leakage is over the permissible value. It is likely that the outside air is introduced into the fuel tank 20 during the decompression. Therefore, it is determined that the sealing of the fuel tank 20 is not enough. In this case, it is likely that the fuel vapor in the fuel tank 20 escapes over the permissible value. When it is determined that impermissible amount of fuel vapor leakage exists, a warning lump on a dashboard (not shown) is turned on to notify the driver of fuel vapor leakage at a successive operation of the vehicle.

When the pressure in the fuel tank 20 is almost equal to the reference pressure Pr, it means that the fuel vapor leakage arises, the fuel vapor leakage being equivalent to the fuel vapor leakage through the orifice 520.

(5) When the detection of fuel vapor leakage is finished, the brushless motor 210 and the switching valve 300 are turned off. This state is illustrated as a range E in FIG. 8. In the ECU 50, it is confirmed that the pressure in the pump passage 162 is recovered to the atmospheric pressure as shown in FIG. 8. Then, the pressure sensor 400 is turned off to finish the all-detecting step.

In this embodiment, because the opening 123 is provided above the outlet 202, the foreign particles deposited on the inner surface of the housing 111 hardly reach to the opening 123 even if the discharged air pushes up the foreign particles. The foreign particles are separated from the discharged air by the gravity to avoid the scatter of the foreign particles.

The control circuit 204 is disposed in the discharge passage 163 to be effectively cooled by the air flowing in the discharge passage 163. Thus, the electricity supplied to the control circuit 204 can be precisely controlled, so that the brushless motor 210 is precisely controlled to detect the fuel vapor.

Furthermore, the foreign particles are hardly introduced into the clearance 204 and into a vicinity of the brushless motor 210, so that mechanical and/or electrical problems in the control circuit 280 and the brushless motor are avoided.

In the embodiment described above, another type of pump can be used instead of the vane-type pump 200. In another embodiment, a pump which can pressurize the inside of the fuel tank 20 can be used. The motor driving the pump 200 is not limited to the brushless motor 210.

What is claimed is:

1. A fuel vapor leak check module for detecting a fuel vapor leakage from a fuel tank by pressurizing or depressurizing the inside of the fuel tank, the fuel vapor leak check module comprising:

a pump pressurizing or depressurizing the inside of the fuel tank;

a motor driving the pump, and a housing accommodating the pump and the motor, wherein the pump has an outlet for discharging air, which is opened downwardly in a gravity direction, and the housing has a deposit-portion on which foreign particles expelled from the outlet are deposited, the deposit-portion being positioned vertically below the outlet.

2. The fuel vapor leak check module according to claim 1, further comprising:

a flange disposed between the pump and the motor, having a larger diameter than that of a pump housing, and having a opening at a periphery thereof, the opening being positioned to make a certain amount of angle relative to the outlet around the center of the flange; and a housing having a pump space for accommodating the pump therein, having a diameter smaller than that of the flange and larger than that of the pump housing, having an end closed by the flange except the opening, and forming a clearance between the pump and the flange, through which an air discharged from the outlet flows.

3. The fuel vapor leak check module according to claim 2, wherein the pump housing has a curvature outer wall and a flat outer wall connecting both ends of the curvature outer wall, and the housing has a stopper confronting the flat outer wall in order to restrict a circumferential rotation of the pump housing.

4. The fuel vapor leak check module according to claim 2, further comprising:

a control circuit for controlling an electricity to be supplied to the motor, the control circuit being disposed in a discharge passage communicating with the clearance, in which the discharged air flows.

5. The fuel vapor leak check module according to claim 4, wherein the control circuit is located above the outlet in a gravity direction while confronting the opening.

6. A fuel vapor leak check module for detecting a fuel vapor leakage from a fuel tank by pressurizing or depressurizing the inside of the fuel tank, the fuel vapor leak check module comprising:

a pump pressurizing or depressurizing the inside of the fuel tank, wherein the pump has an outlet for discharging air, which is opened downwardly in a gravity direction;

a motor driving the pump;

a flange disposed between the pump and the motor, having a larger diameter than that of a pump housing, and having a opening at a periphery thereof, the opening being positioned to make a certain amount of angle relative to the outlet around the center of the flange; and a housing having a pump space for accommodating the pump therein, having a diameter smaller than that of the flange and larger than that of the pump housing, having an end closed by the flange except the opening, and forming a clearance between the pump and the flange, through which an air discharged from the outlet flows.

7. The fuel vapor leak check module according to claim 6, wherein the pump housing has a curvature outer wall and a flat outer wall connecting both ends of the curvature outer wall, and the housing has a stopper confronting the flat outer wall in order to restrict a circumferential rotation of the pump housing.

8. The fuel vapor leak check module according to claim 6, further comprising:

a control circuit for controlling an electricity to be supplied to the motor, the control circuit being disposed in a discharge passage communicating with the clearance, in which the discharged air flows.

9. The fuel vapor leak check module according to claim 8, wherein the control circuit is located above the outlet in a gravity direction while confronting the opening.

* * * * *